United States Patent [19]

Beam, Jr. et al.

[11] 3,736,069

[45] May 29, 1973

[54] TURBINE STATOR COOLING CONTROL

[75] Inventors: Paul E. Beam, Jr.; Albert L. Hunt, Jr.; Esten W. Spears, Jr., all of Indianapolis, Ind.

[73] Assignee: General Motors Corporation, Detroit, Mich.

[22] Filed: Oct. 28, 1968

[21] Appl. No.: 770,919

[52] U.S. Cl. .............. 415/115, 415/172, 416/95, 60/39.66, 138/46, 137/468
[51] Int. Cl. ............................................. F01d 5/14
[58] Field of Search .............. 415/12, 115; 416/95; 60/39.66; 251/11; 137/67, 468; 138/46

[56] References Cited

UNITED STATES PATENTS 2,787,440  4/1957  Thompson ......................... 415/12
2,811,833  11/1957  Broffitt ............................ 60/39.66
2,906,494  9/1959  McCarty et al ..................... 416/39
2,951,340  9/1960  Howald ............................ 60/39.66

Primary Examiner—Samuel Feinberg
Attorney—Paul Fitzpatrick and E. W. Christen

[57] ABSTRACT

The stator of a gas turbine includes an arrangement for controlling flow of cooling air to the vanes of the second stage turbine nozzle from the engine compressor. Control is by a valve defined by two rings extending around the exterior of the turbine nozzle which have different coefficients of thermal expansion so that the gap between them varies in accordance primarily with the temperature of the cooling air which tends to increase with the power output of the engine and thus with the need for cooling air.

5 Claims, 3 Drawing Figures

INVENTORS.
Paul E. Beam, Jr.,
Albert L. Hunt, Jr., &
BY Esten W. Spears, Jr.
Paul Fitzpatrick
ATTORNEY

TURBINE STATOR COOLING CONTROL

The invention herein described was made in the course of work under a contract or subcontract thereunder with the Department of Defense.

Our invention relates to the cooling of turbine stators and particularly to an improved valve or control means to regulate the flow of a cooling fluid such as compressor discharge air or combustion chamber jacket air to vanes of a gas turbine nozzle.

The need for cooling of the parts of very high temperature turbines such as the early stages of the turbines of gas turbine engines is very well known. The efficiency and specific output of such an engine increase with increasing temperature of the motive fluid but tolerance of materials used for vanes and blades is limited without provision of cooling.

In many schemes for cooling gas turbine engines, a proportion of the compressor discharge air determined by fixed metering passages is allowed to flow to the parts of the turbine to be cooled at all times. Such diversion of air from the compressor for cooling imposes a penalty on power output and efficiency of the engine. Thus, it is highly desirable to shut off or diminish the flow of cooling air at low load or low power output conditions of the engine when the temperature is not so high as to create any need for cooling.

Our invention is particularly directed to a simple and effective structure very well adapted to provide such control or regulation of the supply of cooling air to a turbine stator. Our invention also involves what we believe to be a novel valve adapted to be controlled primarily by the temperature of the fluid which the valve acts to control.

The principal objects of our invention are to improve the efficiency and economy of gas turbine engines, to provide improved means for cooling the stator of a gas turbine which responds to a condition indicative of the need for cooling, to provide a simple reliable valve for turbine cooling air which responds primarily to the temperature of the cooling air, and to provide an annular valve which responds to local temperatures by virtue of the difference in coefficient of thermal expansion of the parts which coact to form the valve.

The nature of our invention and the advantages thereof will be apparent to those skilled in the art from the succeeding detailed description of the preferred embodiment of the invention and the accompanying drawings thereof.

Figure 1:
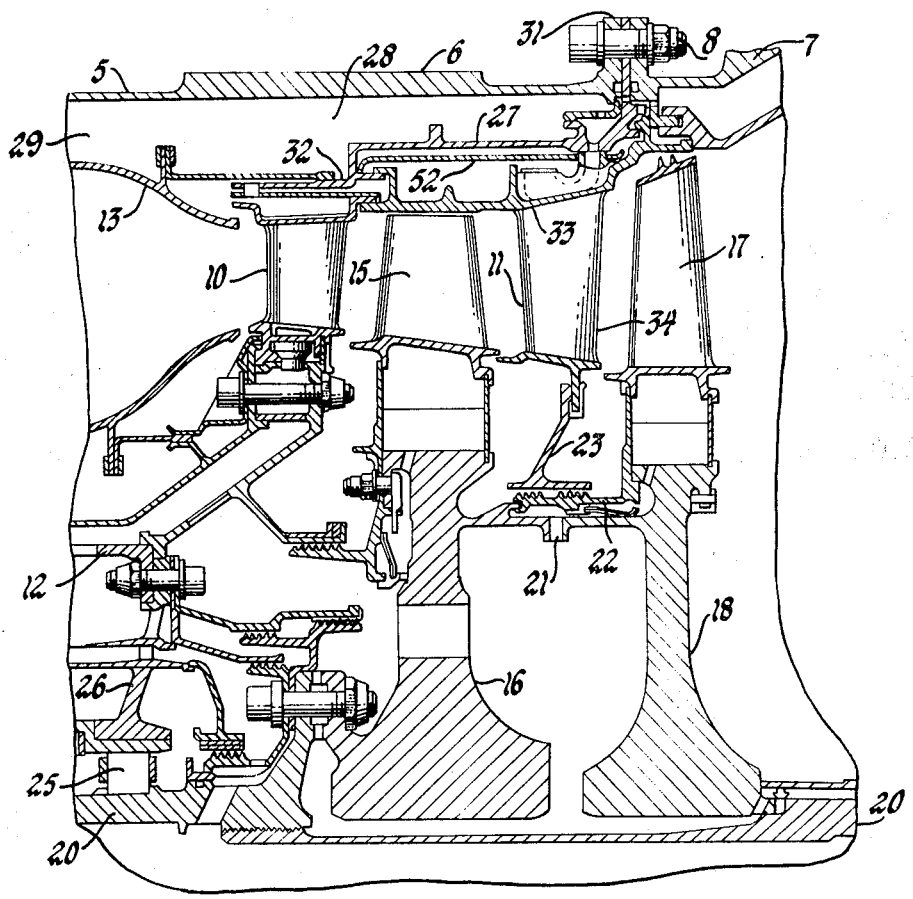
FIG. 1 is a sectional view of a two stage high temperature gas turbine taken on a plane containing the axis of rotation of the turbine.

Referring to the drawings, FIG. 1 shows a high temperature turbine providing a suitable environment for our invention which, however, may be employed in turbines of various configurations. The turbine of FIG. 1 has a case 5 which includes an upstream section 6 of cylindrical configuration and a downstream section 7 joined at a bolting flange by a ring of bolts 8. A first stage turbine nozzle 10 and a second stage turbine nozzle 11 are mounted within the case. A combustion apparatus is defined between the outer case 5 and an annular inner wall 12. Motive fluid is discharged from a combustion liner 13 into the first stage turbine nozzle through which it flows to a ring of blades 15 on a first stage turbine wheel 16, then through the second stage nozzle 11 to a ring of blades 17 on a second stage turbine wheel 18. These wheels are suitably mounted on a shaft 20 and are splined together at 21. The wheels bear the inner member 22 of a labyrinth seal which cooperates with a diaphragm 23 extending inwardly from the second stage nozzle 11. The rotor comprising wheels 16 and 18 and shaft 20 is rotatively supported by means including a roller bearing 25 mounted in a support 26 which extends inwardly from the first stage nozzle 10.

The details of the turbine rotor are quite immaterial to our present invention. The particular rotor shown incorporates means for cooling the rotor which is described fully in an application of Beam and Spears for Turbine Rotor Cooling Ser. No. 770,920 filed Oct. 28, 1968, now U.S. Pat. No. 3,575,528 granted Apr. 20, 1971.

Figure 2:
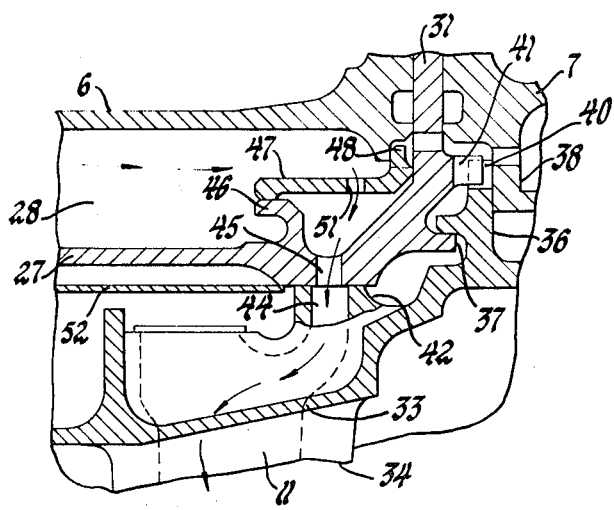
FIG. 2 is an enlarged view of a portion of FIG. 1 illustrating the stator cooling control valve in closed condition.

Referring again to the stator of the engine and to FIG. 2 as well as FIG. 1, the turbine case is of double wall construction including an inner wall cylinder 27 which defines with the case section 6 an annular passage 28 for turbine stator cooling air. This passage may be a continuation of the jacket space or passage 29 between the combustion liner 13 and the outer case 5. The inner wall 27 has a radial flange 31 at its rear end which is held between the flanges of case sections 6 and 7 by the bolts 8, thus mounting the inner wall rigidly in the turbine case. The forward end of the inner wall includes a portion 32 which provides the outer support for the first stage turbine nozzle. The inner margin of the first stage turbine nozzle is bolted to a continuation of the combustion case inner wall 12. The structure of the first stage nozzle is not material to the invention which is the subject of this application.

The second stage turbine nozzle 11 includes an outer shroud 33 from which nozzle vanes 34 extend inwardly. The shroud 33 also provides a fixed shroud around the tips of the blades of the first and second stage rotor wheels. Shroud 33 is constituted in this case by twenty segments each supported by an outwardly extending flange 36, a portion of which pilots over a rearwardly extending flange 37 on the inner wall 27. An inwardly directed flange 38 on the case section 7 bears against the rear surface of flange 36. Teeth 40 on flange 36 engage between teeth 41 extending from the rear face of flange 31 to restrain the shroud 33 against rotation and allow it to expand relative to the case.

The nozzle 11 has three vanes 34 to each segment of the shroud 33. A boss 42 aligned with each vane provides an entrance 44 for cooling air into the interior of the vane. The internal structure of the vane is immaterial to the present invention. The air may be distributed through and from the vane in any way desired.

Each air entrance 44 is aligned with a cooling air hole 45 in the inner wall 27. The holes 45 are downstream of a flange 46 on the outer surface of wall 27 which serves as a valve seat for an air controlling valve structure of the invention. The movable valve member 47 or valve ring is a continuous ring having a forward edge which may engage the flange 46 of the inner wall and which has a mounting flange 48 which is disposed between the rear surface of casing section 6 and the forward face of flange 31 with clearance for radial expansion. The valve ring 47 is made up of material having a higher coefficient of thermal expansion than the inner wall 27. In the particular example described, the wall is made of a commercially available alloy known as Hastelloy B and the valve ring 47 of type 347 stainless steel which has a considerably higher coefficient of expansion than the Hastelloy B.

Figure 3:
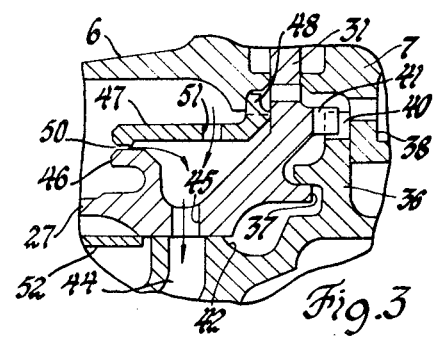
FIG. 3 is a view similar to FIG. 2 showing the valve in open condition.

As illustrated by FIGS. 2 and 3, in FIG. 2 the ring 47 is seated on the valve seat 46; in FIG. 3 the ring 47 has expanded relative to seat 46, opening an annular air inlet 50 between these two parts of the cooling air valve. The flange 48 has expanded farther radially into the space provided for it.

The cooling air also flows at all times through a ring of metering holes 51 in the valve ring 47. In the particular installation shown the flow of air through the holes 51 is desirable primarily to insure circulation of the cooling air past the ring 47 so that it responds to the temperature of the cooling air. In the particular installation the size of the hole 51 is such that the total flow area through these holes is about half that through the annular valve opening 50 when the latter is fully opened.

It should be understood that the opening of the valve at 50 is primarily a function of the temperature of the cooling air although there will be some effects due to radiation from the ring 27 and other parts of the engine. The temperature of the cooling air is used as a convenient parameter which responds to compressor discharge temperature which in turn varies with revolutions per minute of the engine and hence with power. Thus, in the type of engine for which this invention is best suited, the temperature of the cooling air reflects, with a reasonable degree of accuracy, the power level of the engine and hence the need for turbine cooling.

A sheet metal heat shield 52 disposed between the inner wall 27 and the turbine nozzle minimizes transfer of heat by radiation from the nozzle to the wall 27.

It will be apparent from the foregoing to those skilled in the art that the structure described provides a very simple readily incorporated valve which modulates cooling air flow to a turbine stator in accordance with engine operating conditions.

The detailed description of the preferred embodiment of the invention for the purpose of explaining the principles thereof is not to be considered as limiting or restricting the invention, as many modifications may be made by the exercise of skill in the art.

We claim

1. A turbine stator comprising, in combination, a turbine case, an annular wall mounted within the case and defining with the case an annular passage for a cooling fluid, a ring of turbine nozzle vanes mounted on the case within the annular wall, the wall defining openings to pass cooling fluid from the said passage to the vanes and defining an annular valve seat upstream of the openings, and a valve ring extending across the passage upstream of the openings into proximity to the valve seat, the said wall and ring defining between them a valve for cooling fluid and being of materials of different coefficients of thermal expansion so disposed that the clearance between the valve seat and ring varies with the temperature thereof to regulate flow of the cooling fluid from the passage to the vanes.

2. A stator as recited in claim 1 in which the temperature to which the wall and ring respond is predominantly that of the cooling fluid.

3. A stator as recited in claim 2 including means providing continuous circulation of cooling fluid past the wall and ring.

4. A stator as recited in claim 3 including a normally open by-pass past the valve to provide the circulation of cooling fluid.

5. A stator as recited in claim 1 in which the clearance between the wall and ring is radial with respect to the turbine case.

* * * * *